US010250510B2

(12) United States Patent
Sridharan et al.

(10) Patent No.: US 10,250,510 B2
(45) Date of Patent: Apr. 2, 2019

(54) INTELLIGENT NETWORK RESOURCE MANAGER

(71) Applicant: Oracle International Corporation, Redwood Shores, CA (US)

(72) Inventors: Vijay Sridharan, Santa Clara, CA (US); Richard Frank, Groton, MA (US); Jia Shi, Burlingame, CA (US); Kothanda Umamageswaran, Sunnyvale, CA (US); Juan Loaiza, Woodside, CA (US); Alexander Tsukerman, Foster City, CA (US); Bang Nguyen, Irvine, CA (US); Sumanta Chatterjee, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 599 days.

(21) Appl. No.: 14/488,161

(22) Filed: Sep. 16, 2014

(65) Prior Publication Data

US 2015/0089008 A1 Mar. 26, 2015

Related U.S. Application Data

(60) Provisional application No. 61/880,660, filed on Sep. 20, 2013.

(51) Int. Cl.
*G06F 15/16* (2006.01)
*H04L 12/851* (2013.01)
*H04L 29/08* (2006.01)

(52) U.S. Cl.
CPC .......... *H04L 47/24* (2013.01); *H04L 47/2433* (2013.01); *H04L 47/2441* (2013.01); *H04L 67/322* (2013.01)

(58) Field of Classification Search
CPC ............ H04N 21/2385; G06F 17/3053; H04L 2012/5651; H04L 47/10; H04L 47/2443;
(Continued)

(56) References Cited

U.S. PATENT DOCUMENTS 5,500,672 A * 3/1996 Fujii ...................... H04N 7/147
348/14.01
5,812,528 A * 9/1998 VanDervort .............. H04J 3/14
370/235

(Continued)

*Primary Examiner* — Thomas J Dailey
*Assistant Examiner* — Aye M Aung
(74) *Attorney, Agent, or Firm* — Hickman Palermo Becker Bingham LLP

(57) ABSTRACT

A method and apparatus for intelligent network resource manager for distributed computing systems is provided. A first priority is assigned to a first virtual channel set that includes at least two virtual channels of a plurality of virtual channels associated with a physical communication channel. A second priority is assigned to a second virtual channel set that includes at least one virtual channel of the plurality of virtual channels. The first virtual channel set has more virtual channels than the second virtual channel set. Outbound messages of the first priority are directed to virtual channels of the first virtual channel set. Outbound messages of the second priority are directed to virtual channels of the second virtual channel set. The virtual channels are processed in a round-robin order, where processing includes sending the outbound messages over the physical communication channel.

17 Claims, 5 Drawing Sheets

(58) Field of Classification Search
CPC ....... H04L 63/10; H04L 65/80; H04L 67/322; H04L 29/06; H04L 47/24; H04L 47/2433; H04L 47/2441; H04L 69/324
USPC .......................................................... 709/207
See application file for complete search history.

(56) References Cited

U.S. PATENT DOCUMENTS

| | | | | |
|---|---|---|---|---|
| 6,005,851 | A * | 12/1999 | Craddock | H04L 29/06 370/329 |
| 7,283,468 | B1 * | 10/2007 | Hill | H04L 45/302 370/229 |
| 2001/0049289 | A1 * | 12/2001 | Kim | H04W 88/02 455/466 |
| 2002/0051456 | A1 * | 5/2002 | Kinnunen | H04L 47/10 370/397 |
| 2004/0120336 | A1 * | 6/2004 | Hendel | H04L 47/24 370/412 |
| 2007/0092225 | A1 * | 4/2007 | Inakura | G11B 27/034 386/338 |
| 2007/0198700 | A1 * | 8/2007 | Vivian | G06F 11/2097 709/224 |
| 2008/0259833 | A1 * | 10/2008 | Ozturk | H04L 1/0007 370/310 |
| 2009/0002233 | A1 * | 1/2009 | Huang | G01S 19/27 342/357.66 |
| 2009/0103501 | A1 * | 4/2009 | Farrag | H04W 74/02 370/337 |
| 2010/0095025 | A1 * | 4/2010 | Ko | H04L 47/10 710/12 |
| 2010/0332676 | A1 * | 12/2010 | Sugumar | H04L 47/10 709/232 |
| 2011/0106778 | A1 * | 5/2011 | Chan | G06F 17/30362 707/704 |
| 2011/0185068 | A1 * | 7/2011 | Schmieder | H04L 69/16 709/227 |
| 2011/0276699 | A1 * | 11/2011 | Pedersen | H04L 45/24 709/227 |
| 2011/0310739 | A1 * | 12/2011 | Aybay | H04L 47/10 370/235 |
| 2012/0197990 | A1 * | 8/2012 | Li | H04L 51/066 709/204 |
| 2014/0036930 | A1 * | 2/2014 | Lih | H04L 49/252 370/429 |

* cited by examiner

|  | PRIORITY 1 (102) | PRIORITY 2 (104) |
|---|---|---|
| CATEGORY 1 (106) | 1<br>2<br>7 | 3 |
| CATEGORY 2 (108) | 4<br>6 | 0 |

*FIG. 1*

| LANE ID | PRIORITY | CATEGORY | WEIGHT |
|---------|----------|----------|--------|
| 0 | 2 | 2 | 4 |
| 1 | 1 | 1 | 4 |
| 2 | 1 | 1 | 4 |
| 3 | 2 | 1 | 4 |
| 4 | 1 | 2 | 16 |
| 5 | -- | -- | -- |
| 6 | 1 | 2 | 8 |
| 7 | 1 | 1 | 4 |

*FIG. 2*

INTELLIGENT NETWORK RESOURCE MANAGER

CROSS-REFERENCE TO RELATED APPLICATIONS; BENEFIT CLAIM

This application claims the benefit of Provisional Appln. 61/880,660, filed Sep. 20, 2013 the entire contents of which is hereby incorporated by reference as if fully set forth herein, under 35 U.S.C. § 119(e).

FIELD OF THE INVENTION

The present invention relates to distributed systems.

BACKGROUND

As Internet technologies advance, e-commerce, multimedia, business-to-business and other applications must reliably support an increasing volume of data. Large amounts of traffic must be routed while maintaining specified Quality of Service (QoS) levels. QoS refers to the capability of a network to provide consistent levels of service to selected network traffic or applications. QoS levels are particularly important in Online Transaction Processing (OLTP) systems designed to immediately respond to user requests. OLTP involves obtaining input data, processing the data, and performing updates in the system to reflect the processed input data. Most applications use a database management system (DBMS) to support OLTP.

One important factor for database I/O performance is latency. Latency refers to the amount of time it takes to store or retrieve data. Latency is an issue even if the amount of data involved is small. For example, latency is affected as a request travels across switches, within a server's operating system I/O stack, and other hardware in a database system.

Different types of database input and output (I/O) have different sensitivities to latency. For example, in the Oracle™ Relational Database Management System (RDBMS) environment, redo logs are latency sensitive. Redo logs include redo records that provide a history of all changes made to the corresponding database. Redo log I/O is latency sensitive because transactions typically wait for return confirmation that the redo records have been persisted. Therefore, redo log I/O has a large impact on the performance of OLTP systems. Other types of database I/O, such as batch, reporting, and backup-related I/O, are less latency sensitive. Nevertheless, some types of database I/O that are not latency sensitive are significant consumers of network bandwidth. When non-latency sensitive I/O requires high network bandwidth, latency may increase. Database systems must handle both latency sensitive and non-latency sensitive transactions while taking latency sensitivity into consideration. Typical solutions for minimizing latency range from simply rescheduling bandwidth-intensive jobs (e.g. to off hours) to maintaining dedicated OLTP systems.

Thus, there is a need for a solution that effectively utilizes storage network bandwidth while at the same time, meeting the latency requirements for latency-sensitive Database I/O.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a block diagram depicting an embodiment of an assignment of a priority and a category to plurality of virtual channels associated with a physical communication channel;

FIG. 2 is a block diagram depicting an embodiment of an assignment of a priority, a category and a weight to a plurality of virtual channels associated with a physical communication channel;

DETAILED DESCRIPTION

Figure 3:
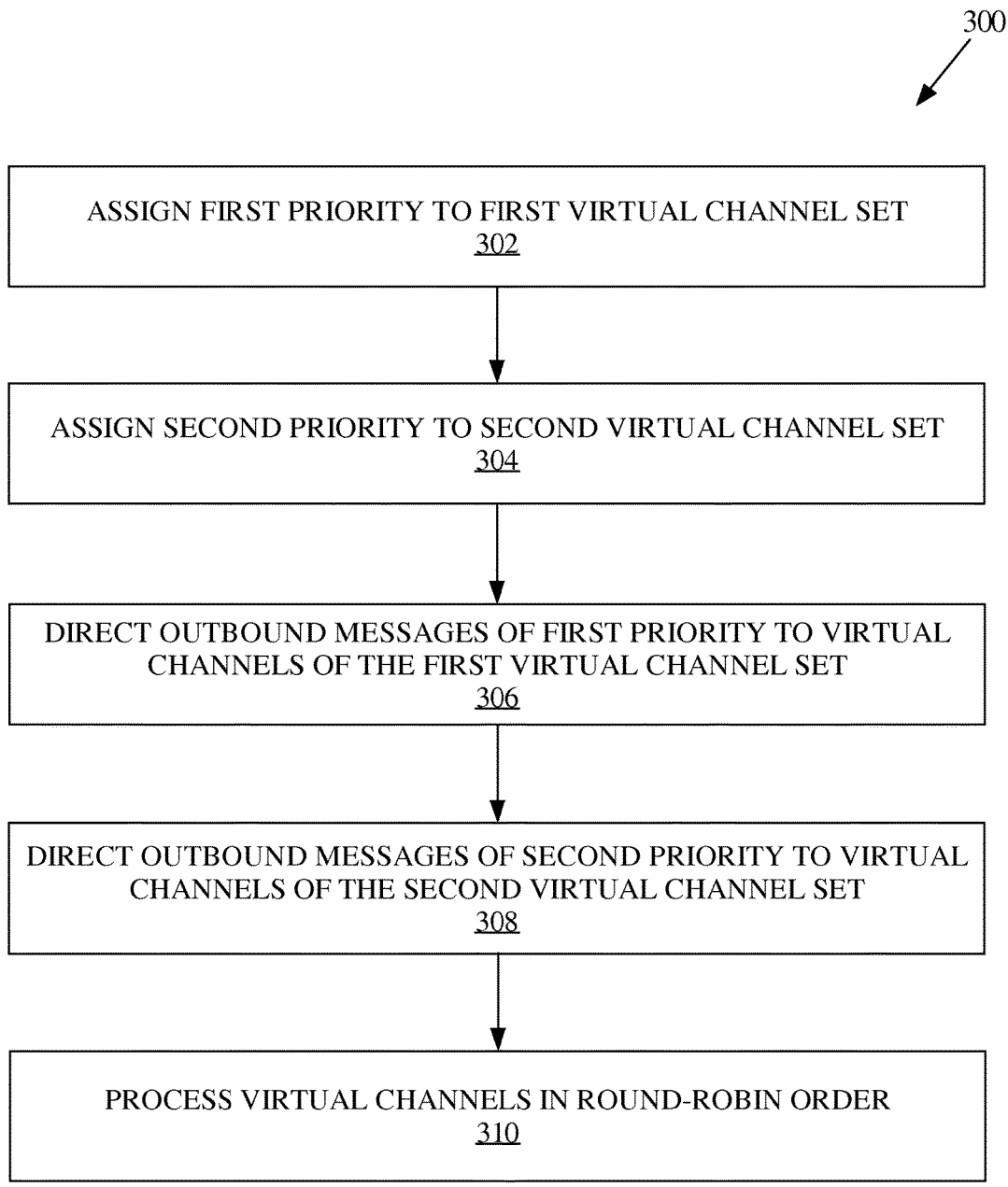
FIG. 3 is a flow diagram that illustrates an embodiment of a process for directing outbound messages to a plurality of virtual channels associated with a physical communication channel based on priority.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An intelligent network resource manager is described herein. A set of virtual channels are available on a physical communication channel. The set of virtual channels allow multiple data flows to share the same physical communication channel. Each virtual channel manages an independent data flow and may use distinct resources, such as buffering and flow control resources. The virtual channels are processed in a circular order to send the outbound messages over the physical communication channel. At each turn, an equal portion of the data flow of each virtual channel is processed. In one embodiment, one or more virtual channels may be weighted, and a weighted portion of the data flow is processed.

A plurality of virtual channels is selected from the set of available virtual channels. A selected priority is assigned to each virtual channel of the plurality of virtual channels. In one embodiment, the priority for each virtual channel is selected from a first priority and a second priority. Outbound messages of the first priority are directed to virtual channels of the first priority, and outbound messages of the second priority are directed to virtual channels of the second priority. In one embodiment, more virtual channels are assigned the first priority than the second priority. In other words, more virtual channels are available for messages of the first priority. When the virtual channels are processed in circular order, this leads to more bandwidth being available for the high priority outbound messages.

A selected category may also be assigned to each virtual channel of the plurality of virtual channels. In one embodiment, the category for each virtual channel is selected from a first category and a second category. Outbound messages of the first category are directed to virtual channels of the first category, and outbound messages of the second category are directed to virtual channels of the second category. In one embodiment, the first category is a first message size category, and the second category is a second message size category that is larger than the first message size category. This prevents messages of the first message size from being queued after a larger message of the second message size in a virtual channel. In one embodiment, more virtual channels are assigned the first category than the second category such that more virtual channels are available for messages of the first category.

One or more available virtual channels may be reserved (i.e. not assigned a priority and/or category). Infiniband™ provides QoS functionality including low-priority Infiniband™ Virtual Lanes and high-priority Infiniband™ Virtual Lanes. In one embodiment, the virtual channels assigned a priority and/or category are low-priority Infiniband™ Virtual Lanes. One or more Infiniband™ Virtual Lanes may be reserved, including one or more high-priority Infiniband™ Virtual Lanes.

Virtual Channel Priority and Category

In one embodiment, a first virtual channel set comprising at least two virtual channels is assigned a first priority. A second virtual channel set comprising at least one virtual channel is assigned a second priority. The first virtual channel set has more virtual channels than the second virtual channel set. Not all available virtual channels associated with the physical communication channel must be used.

In one embodiment, REDO Log I/O messages are assigned the first priority. Thus, outbound REDO Log I/O messages are directed to virtual channels of the first virtual channel set. In the Oracle™ RDBMS environment, redo logs are generated for all changes made to a corresponding database. Each redo record of a redo log file includes change vectors that describe changes made in the database. REDO Log I/O will be described in greater detail hereafter.

Categories may also be assigned to the virtual channels and used to directed outbound messages. In one embodiment, two categories are used: a first category for a small message size and a second category for a large message size. The two categories may be determined based on a size threshold. This prevents messages of the first message size category from being queued after a larger message of the second message size category in a virtual channel. In one embodiment, the size threshold is determined based on one or more database properties, such as a data block size. The size threshold may be chosen such that most outbound REDO Log I/O messages are expected to fall into the first message size category.

In one embodiment, each virtual channel of the first virtual channel set (i.e. the virtual channels assigned the first priority) is assigned one of the first category and the second category. Outbound messages corresponding to the first category are directed to virtual channels of the first category, and outbound messages corresponding to the second category are directed to virtual channels of the second category. In this case, three classes of virtual channels are created:
  FIRST PRIORITY, FIRST CATEGORY;
  FIRST PRIORITY, SECOND CATEGORY; and
  SECOND PRIORITY.

When (1) REDO Log I/O messages are assigned the first priority, (2) the first category and the second category are based on size, and (3) most outbound REDO Log I/O messages are expected to fall into the first message size category, most outbound REDO Log I/O messages will be directed to virtual channels assigned the first priority and the first category.

In one embodiment, each virtual channel of the second virtual channel set (i.e. the virtual channels assigned the second priority) is assigned one of the first category and the second category. In this case, three classes of virtual channels are created:
  FIRST PRIORITY
  SECOND PRIORITY, FIRST CATEGORY; and
  SECOND PRIORITY, SECOND CATEGORY.

When (1) REDO Log I/O messages are assigned the first priority, outbound REDO Log I/O messages will be directed to virtual channels assigned the first priority.

In one embodiment, each virtual channel of both the first virtual channel set (i.e. the virtual channels assigned the first priority) and the second virtual channel set (i.e. the virtual channels assigned the second priority) is assigned one of the first category and the second category. In this case, four classes of virtual channels are created:
  FIRST PRIORITY, FIRST CATEGORY;
  FIRST PRIORITY, SECOND CATEGORY;
  SECOND PRIORITY, FIRST CATEGORY; and
  SECOND PRIORITY, SECOND CATEGORY.

When (1) REDO Log I/O messages are assigned the first priority, (2) the first category and the second category are based on size, and (3) most outbound REDO Log I/O messages are expected to fall into the first message size category, most outbound REDO Log I/O messages will be directed to virtual channels assigned the first priority and the first category, and larger REDO Log I/O messages will be directed to virtual channels assigned the first priority and the second category.

FIG. 1 is a block diagram depicting an embodiment of an assignment of a priority and a category to plurality of virtual channels associated with a physical communication channel. FIG. 1 shows a plurality of virtual channels associated with a physical communication channel. The virtual channels are shown using unique identifiers 0, 1, 2, 3, 4, 6, and 7. The virtual channels are logical channels associated with the physical communication channel.

The virtual channels are assigned a priority selected from a set of possible priorities. For example, virtual channels 1, 2, 4, 6, and 7 are assigned a first priority 102 ("PRIORITY 1"), and virtual channels 0 and 3 are assigned a second priority 104 ("PRIORITY 2"). Outbound messages of the first priority are directed to virtual channels of the first priority 102, while outbound messages of the second priority are directed to virtual channels of the second priority 104.

The physical communication channel is configured to process the virtual channels in a round-robin order. QoS may be tailored by changing the number of virtual channels assigned to a particular priority. In one embodiment, more virtual channels are assigned the first priority 102 than the second priority 104.

The virtual channels may also be assigned a category selected from a set of possible categories. For example, virtual channels 1, 2, 3, and 7 are assigned a first category 106 ("CATEGORY 1"), and virtual channels 0, 4, and 6 are assigned a second category 108 ("CATEGORY 2"). Outbound messages corresponding to the first category 106 are directed to virtual channels of the first virtual channel set, while outbound messages corresponding to the second category 108 are directed to virtual channels of the second virtual channel set.

In one embodiment, the set of possible categories are defined based on message size. For example, first category 106 may be a first message size category and second category 108 may be a second message size category that is larger than the first message size category. When larger messages are directed to different virtual channels than smaller messages, smaller latency sensitive messages will typically reach the head of a virtual channel more predictably due to the elimination of the potential of incurring the transfer time for larger messages that were previously enqueued.

In one embodiment, for virtual channels assigned the first category 106, more virtual channels are assigned the first priority 102 than the second priority 104. For example, in FIG. 1, of the four virtual channels assigned the first category 106, three virtual channels are assigned the first priority 102 and one virtual channel is assigned the second priority 104.

In one embodiment, for virtual channels assigned the second category 108, more virtual channels are assigned the first priority 102 than the second priority 104. For example, in FIG. 1, of the three virtual channels assigned the second category 106, two virtual channels are assigned the first priority 102 and one virtual channel is assigned the second priority 104.

Virtual Channel Configuration

Figure 2:
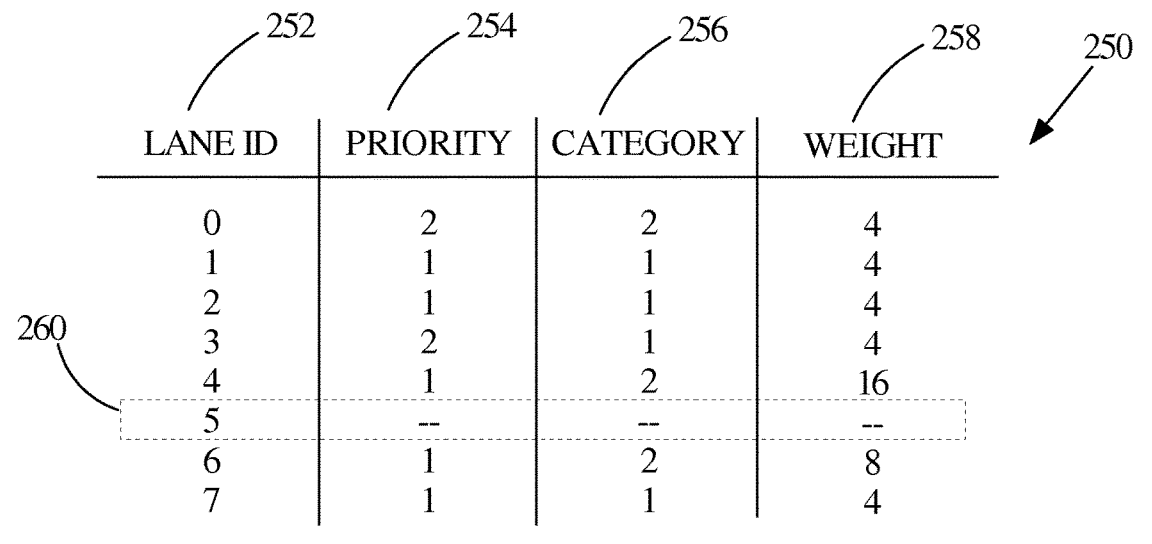

FIG. 2 is a block diagram depicting an embodiment of an assignment of a priority, a category and a weight to a plurality of virtual channels associated with a physical communication channel. Table 250 includes data corresponding to a plurality of virtual channels associated with a physical communication channel. In one embodiment, available virtual channels, such as Infiniband™ Virtual Lanes, are configured on one or more devices. Such configurations may be propagated across other connected devices in the same network.

In table 250, the Lane ID 252 field contains a unique identifier for each virtual channel in a set of virtual channels. The virtual channels specified by a particular lane ID 250 may be assigned at least one of a priority, category and weight. The priority 254 field contains the priority assigned to the corresponding virtual channel. The category 256 field contains the category assigned to the corresponding virtual channel. The weight 258 contains the weight assigned to the corresponding virtual channel. When, the virtual channels are weighted, the amount of data processed and sent from a particular virtual channel during its turn is weighted based on the weight assigned to the particular virtual channel.

In one embodiment, one or more virtual channels in a set of available virtual channels is reserved. Reserved virtual channel 260 is not assigned a priority 254 or category 256 because it is not used in the described QoS scheme that is based on priority and/or category. However, reserved virtual channel 260 may be used in another QoS scheme. For example, the Infiniband™ architecture provides 8 virtual lanes, which may be each designated as a high-priority Infiniband™ virtual lane or a low-priority Infiniband™ Virtual Lane. Reserved virtual channel 260 may be reserved for potential or actual use as a high-priority Infiniband™ Virtual Lane, while the non-reserved virtual channels may be implemented as low-priority Infiniband™ Virtual Lanes. In one embodiment, a mechanism is implemented to prevent unauthorized software from using reserved virtual channel 260.

The assignment data shown in FIG. 2 is presented as a single table. The actual assignment data may be stored as one or more tables or as one or more other data structures. The assignment data in table 250 may be used to configure one or more network elements, including one or more switches, routers and/or other hardware in an underlying network architecture, such as an Infiniband™ switch, router and/or other hardware.

The configuration may be performed automatically, such as based on a configuration file, automatic optimization tests or procedures, a default setting, or other configuration settings. In one embodiment, a user, such as an administrator, manager, or other user, may perform one or more portions of the configuration, including specifying how many Virtual Lanes map to a particular priority and/or category. The specific Virtual Lanes that map to a particular priority and/or category may also be mapped. In addition, the priority assigned to different messages, the category types, the category ranges, and the weights of the Virtual Lanes may be configured.

Virtual Channel Message Processing

Outbound messages in the virtual channels are processed and sent over the physical communication channel. In one embodiment, the virtual channels are processed in a circular order. The virtual channels may be processed using a round-robin scheme. In this case, bandwidth is assigned to each process in equal portions and in circular order, and messages from the virtual channels are processed. In one embodiment, the virtual channels are processed using a weighted round-robin scheme. In this case, bandwidth is assigned to each process in proportion to the weight and in circular order. If a particular virtual channel is empty or becomes empty during its turn before processing and sending the allocated amount of data, processing proceeds to the next virtual channel. No additional priority scheme is necessary other than the virtual channel configuration by priority, category and/or weight.

In one embodiment, the messages are segmented into packets based on size, and an equal number of packets are processed and sent from a virtual channel during its turn in the round-robin order. In one embodiment, the virtual channels are weighted, and the number of packets that are processed and sent from a virtual channel during its turn up is weighted based on the weight assigned to the virtual channel.

Infiniband™ Architecture

One or more embodiments described herein may be implemented over any network architecture, including but not limited to a switch-based I/O fabric architecture. The implementation may use one or more features of the network architecture. In one embodiment, the implementation is designed for an InfiniBand™ fabric architecture. Infini-Band™ is a switched-based I/O fabric architecture typically used for high-performance and/or enterprise solutions.

A switched fabric network topology includes network nodes interconnected by one or more network switches. The switched fabric network spreads network traffic across multiple physical links. Features of InfiniBand™ include high throughput, low latency, QoS, failover, and scalability. The switched fabric architecture provides scalability which can be accomplished by adding switches to the fabric. Unlike a shared bus architecture, the aggregate bandwidth increases as additional switches are added to the network. Multiple paths between devices keep the aggregate bandwidth high and provide failsafe, redundant connections.

InfiniBand™ transmits data as messages or packets of up to 4 KB. Examples of messages include a direct memory access read from or, write to, a remote node, a channel send, a channel receive, a transaction-based operation, a multicast transmission and an atomic operation. All InfiniBand™ transmissions begin or end at a channel adapter. For example, processors have host channel adapters (HCAs) and peripherals have target channel adapters (TCAs). These channel adapters can also exchange information for security or QoS.

Communications are transmitted as messages that are segmented into packets. The payload of each packet is limited by the maximum transmit unit (MTU) negotiated for the path between a first channel adapter and a second channel adapter. Segmentation and reassembly of packets is done in hardware. Typical MTUs are 256 bytes and 2048 bytes.

Infiniband™ Virtual Lanes

In one embodiment, one or more embodiments described herein are implemented on an Infiniband™ architecture by configuring Infiniband™ Virtual Lanes (VL). For example, priority tables, Service Level (SL) to Virtual Lane (VL) mapping and the QoS policy rules are configured in the Infiniband™ devices. This information will get propagated to new nodes when they join the fabric.

The port side of a channel adapter implements InfiniBand™ Virtual Lanes. InfiniBand™ Virtual Lanes enable multiple independent data flows to share same physical communication link. Buffering and flow control may be separately implemented for each Virtual Lane. Currently, 8 Virtual Lanes are available on each InfiniBand™ link. QoS is supported via low-priority Infiniband™ Virtual Lane and high-priority Infiniband™ Virtual Lane configurations. Each Virtual Lane has its own dedicated set of associated buffering resources. The InfiniBand™ fabric can be regarded as an overlay of multiple logical fabrics that only share the physical links.

Virtual lane arbitration is the mechanism an output port utilizes to select from which Virtual Lane to transmit. The InfiniBand™ architecture specifies a dual-priority weighted round robin scheme. In a round-robin scheme for scheduling, bandwidth is assigned to each process in equal portions and in circular order, handling all processes without priority. In a weighted round-robin scheme, bandwidth is assigned to each process in proportion to the weight.

Packets from high-priority InfiniBand™ Virtual Lanes are always transmitted ahead of those from low-priority InfiniBand™ Virtual Lanes. Within a given priority, data is transmitted from InfiniBand™ Virtual Lanes in approximate proportion to their assigned weights (excluding InfiniBand™ Virtual Lanes that have no outbound data to be transmitted).

InfiniBand™ is further described in Crupnicoff, Diego et al., "Deploying Quality of Service and Congestion Control in InfiniBand-based Data Center Networks," (Document No. 2379, Rev. 1.0), available at "http://www.mellanox.com/pdf/whitepapers/deploying_qos_wp_10_19_2005.pdf," the contents of which are incorporated herein by reference in its entirety. However, one or more embodiments described herein may use the architecture described in the cited reference in a manner that deviates from the stated purpose in the cited reference. For example, although InfiniBand™ provides for low-priority and high-priority Infiniband™ Virtual Lane configurations, using the built-in high-priority protocols does not achieve the desired performance, such as with respect to redo log I/O latency in the example described below.

Redo Log I/O

In the Oracle™ RDBMS environment, redo logs are generated for all changes made to a corresponding database. Each redo record of a redo log file includes change vectors that describe changes made in the database. For example, redo records are generated when a database operation is performed that makes changes to the database. The redo logs may be used in many ways, including but not limited to database recovery, replay, rollback, backup, and other functions.

When a transaction is committed, the redo records corresponding to the transaction are written to an available redo log file, along with data identifying the transaction. Oracle™ LoG WRiters (LGWRs) is a background process that writes the redo log buffers to the on-line redo log files. Whenever a transaction is committed, LGWR writes the transaction redo records from the redo log buffer to a redo log file, and assigns a system change number (SCN) to identify the redo records for each committed transaction. The process that submitted the transaction is notified that the transaction has committed only after all the redo records are persistently written. This is one point where reducing latency is important.

An OLTP workload can benefit greatly from fast response times for database log writes. With respect to redo log I/O, latency strongly affects the performance of OLTP systems. If there are no application-related bottlenecks or contention for database locks and resources, one limiting factor in database system performance may be an amount of time spent waiting for redo log writes. In one embodiment, virtual channels are assigned priorities and categories to prioritize LGWR issued I/O to minimize redo log I/O latency, which shall be described in greater detail hereafter.

Redo log I/O is described in greater detail in: U.S. application Ser. No. 13/346,656, Utilizing Multiple Storage Devices To Reduce Write Latency For Database Logging, filed by Kesavan P. Srinivasan, et al. on Jan. 9, 2012; U.S. application Ser. No. 13/485,557, Rapid Recovery From Loss Of Storage Device Cache, filed by Juan R. Loaiza, et al. on May 31, 2012; U.S. application Ser. No. 13/801,319, Rapid Recovery From Downtime Of Mirrored Storage Device, filed by Juan R. Loaiza, et al. on May 13, 2013; U.S. application Ser. No. 13/288,785, Write-Back Storage Cache Based On Fast Persistent Memory, filed by Bharat Chandra Baddepudi, et al. on Nov. 3, 2011; and U.S. application Ser. No. 12/871,805, Controlling Data Lag In A Replicated Computer System, filed by Jia Shi, et al. on Aug. 30, 2010; the contents of which are incorporated herein by reference in their entirety.

Example Configuration to Prioritize Redo Log I/O

The configuration described in this section is an example of a configuration for prioritizing redo log I/O to reduce latency. This configuration is deployable in an Oracle™ Exadata™ database server.

In an Oracle™ database, I/Os issued by one or more LGWR processes are prioritized. 3 QoS levels are defined:

VIP for LGWR initiated I/O operations;

NORMAL for other processes; and

DEFAULT for external clients that do not specify any QoS level,

I/O messages with a QoS level of NORMAL and DEFAULT are treated equally. I/O messages with a QoS level of VIP are prioritized over those with a QoS level of NORMAL or DEFAULT.

Two size categories are created:

SMALL for messages with up to 32K of payload; and

LARGE for messages with greater than 32K of payload.

The 32K size threshold is based on one or more database block size characteristics.

7 of the 8 available Virtual Lanes in the Infiniband™ architecture are configured as low-priority Infiniband™ Virtual Lanes. One Virtual Lane is reserved, such as for potential use as a high-priority Infiniband™ Virtual Lane. Seven virtual channels are configured as follows:

VIP, SMALL for 3 low-priority Infiniband™ Virtual Lanes;

VIP, LARGE for 1 low-priority Infiniband™ Virtual Lane;

DEFAULT/NORMAL, SMALL for 2 low-priority Infiniband™ Virtual Lanes; and

DEFAULT/NORMAL, LARGE for 1 low-priority Infiniband™ Virtual Lane.

Given the QoS level and typical size of redo log I/O, redo log I/O messages are typically directed to the VIP, SMALL Virtual Lanes. When multiple LGWR processes are running, one or more LGWR processes may be hashed to one of the three VIP/SMALL Virtual Lanes.

Process for Directing Outbound Messages Based on Priority

FIG. 3 is a flow diagram that illustrates an embodiment of a process for directing outbound messages to a plurality of virtual channels associated with a physical communication channel based on priority. Process 300 may be performed by one or more computing devices. For example, one or more blocks of process 300 may be performed by computer system 500.

In block 302, a first priority is assigned to a first virtual channel set. The first virtual channel set includes at least two virtual channels selected from a plurality of virtual channels associated with a physical communication channel.

In block 304, a second priority is assigned to a second virtual channel set. The second virtual channel set includes at least two virtual channels selected from the same plurality of virtual channels associated with the same physical communication channel. The first virtual channel set has more virtual channels than the second virtual channel set, so more virtual channels of the plurality of virtual channels are assigned the first priority than the second priority.

In block 306, outbound messages of the first priority are directed to the virtual channels belonging to the first virtual channel set. In one embodiment, one or more specific message types are identified as having first priority. The one or more specific message types may be pre-determined or dynamically specified, such as by a user. In one embodiment, REDO log I/O messages are identified as having the first priority.

In block 308, outbound messages of the second priority are directed to the virtual channels belonging to the second virtual channel set. In one embodiment, one or more specific message types are identified as having the second priority. The one or more specific message types may be pre-determined or dynamically specified, such as by a user. Alternatively or in addition, a set of prioritized message types are identified as having the first priority outbound messages, and remaining messages types (e.g. outbound messages of a type not included in the set of prioritized message types) are treated as having the second priority.

In block 310, the virtual channels are processed in round-robin order. Outbound messages in the virtual channels are sequentially processed and sent over the physical communication channel. In one embodiment, the messages are segmented into packets based on size, and an equal number of packets are processed and sent from a virtual channel during its turn in the round-robin order. In one embodiment, the virtual channels are weighted, and the number of packets that are processed and sent from a virtual channel during its turn is weighted based on the weight assigned to the virtual channel. If a particular virtual channel is empty or becomes empty during its turn, processing proceeds to the next virtual channel.

Process for Directing Outbound Messages Based on Priority and Category

Figure 4:
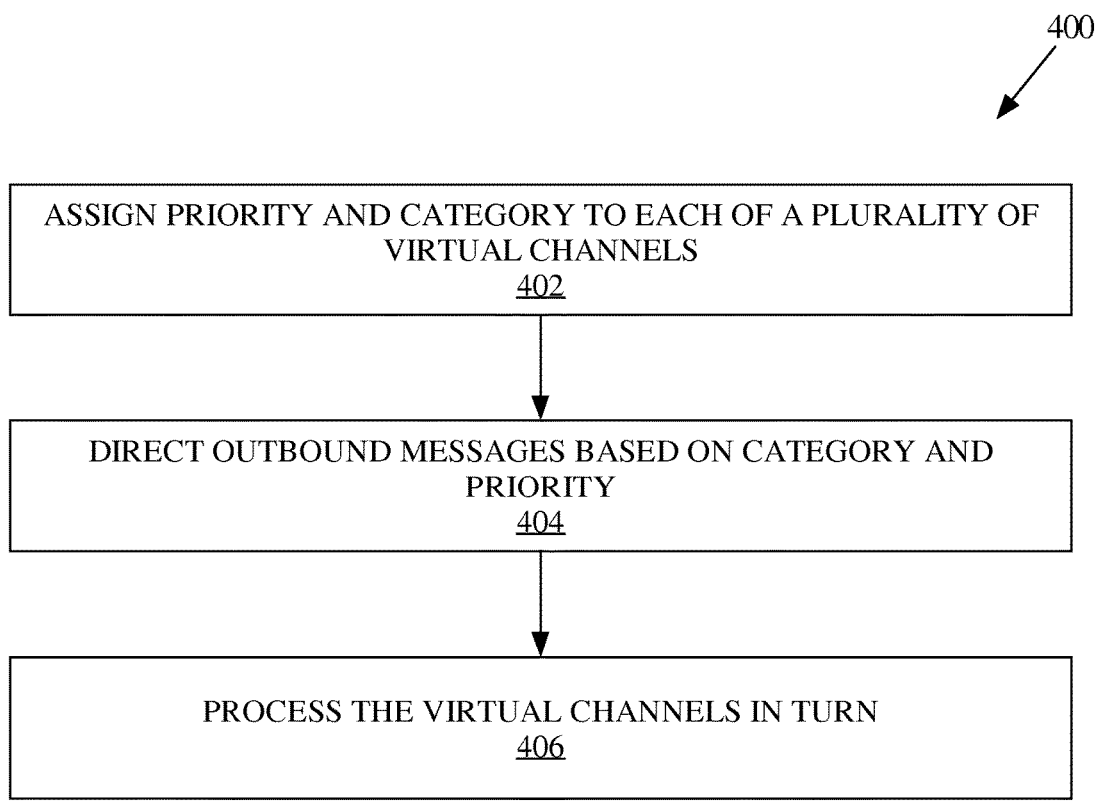
FIG. 4 is a flow diagram that illustrates an embodiment of a process for directing outbound messages to a plurality of virtual channels associated with a physical communication channel based on priority and category.

FIG. 4 is a flow diagram that illustrates an embodiment of a process for directing outbound messages to a plurality of virtual channels associated with a physical communication channel based on priority and another category. Process 400 may be performed by one or more computing devices. For example, one or more blocks of process 400 may be performed by computer system 500.

In block 402, a selected priority and a selected category are assigned to each virtual channel of a plurality of virtual channels associated with a physical communication channel. The selected priority is selected from two or more valid priorities, which may be pre-determined or dynamically specified, such as by a user. For example, the selected priority may be selected from a first priority and a second priority. In one embodiment, the first priority is considered a higher priority than the second priority. More virtual channels of the plurality of virtual channels may be assigned the first priority than the second priority.

The selected category is selected from two or more valid categories, which may be pre-determined or dynamically specified, such as by a user. In one embodiment, the category is based on message size. For example, the selected category may be selected from a small message size category and a large message size category. In one embodiment, the size categories are defined by one or more thresholds such that REDO log I/O messages typically fall under the small message size category.

In block 404, outbound messages are directed to the plurality of virtual channels based on category and priority. For example, if the categories include a first category and a second category, then outbound messages of the first category are directed to a virtual channel assigned the first category, while outbound messages of the second category are directed to a virtual channel assigned the second category. In one embodiment, the two or more valid categories are based on size. For example, the valid categories may include a small message size category and a large message size category. When the valid categories include one or more size-based categories, the categories may be defined by one or more size thresholds.

Outbound messages are also directed to a virtual channel based on priority. Outbound messages of a particular priority are directed to one of the virtual channels assigned the particular priority. In one embodiment, one or more specific message types are assigned the particular priority.

In one embodiment, the valid priorities include at least a first priority and a second priority, where more virtual channels are assigned the first priority than the second priority. In one embodiment, one or more first specific message types are identified as having the first priority, and one or more second specific message types are identified as having the second priority. The one or more first specific message types and/or the one or more second specific message types may be pre-determined or dynamically specified, such as by a user. In one embodiment, REDO log I/O messages are identified as having the first priority.

Alternatively or in addition, a specific set of message types are identified as having the first priority, and remaining outbound messages (e.g. outbound messages of a type not included in the specific set of message types) are assigned the second priority.

In block 406, the virtual channels are processed in a circular order to send the outbound messages over the physical communication channel. In one embodiment, the messages are segmented into packets based on size, and an equal number of packets are processed and sent from a virtual channel during its turn in the round-robin order. In one embodiment, the virtual channels are weighted, and the number of packets that are processed and sent from a virtual channel during its turn is weighted based on the weight assigned to the virtual channel. If a particular virtual channel is empty or becomes empty during its turn, processing proceeds to the next virtual channel.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
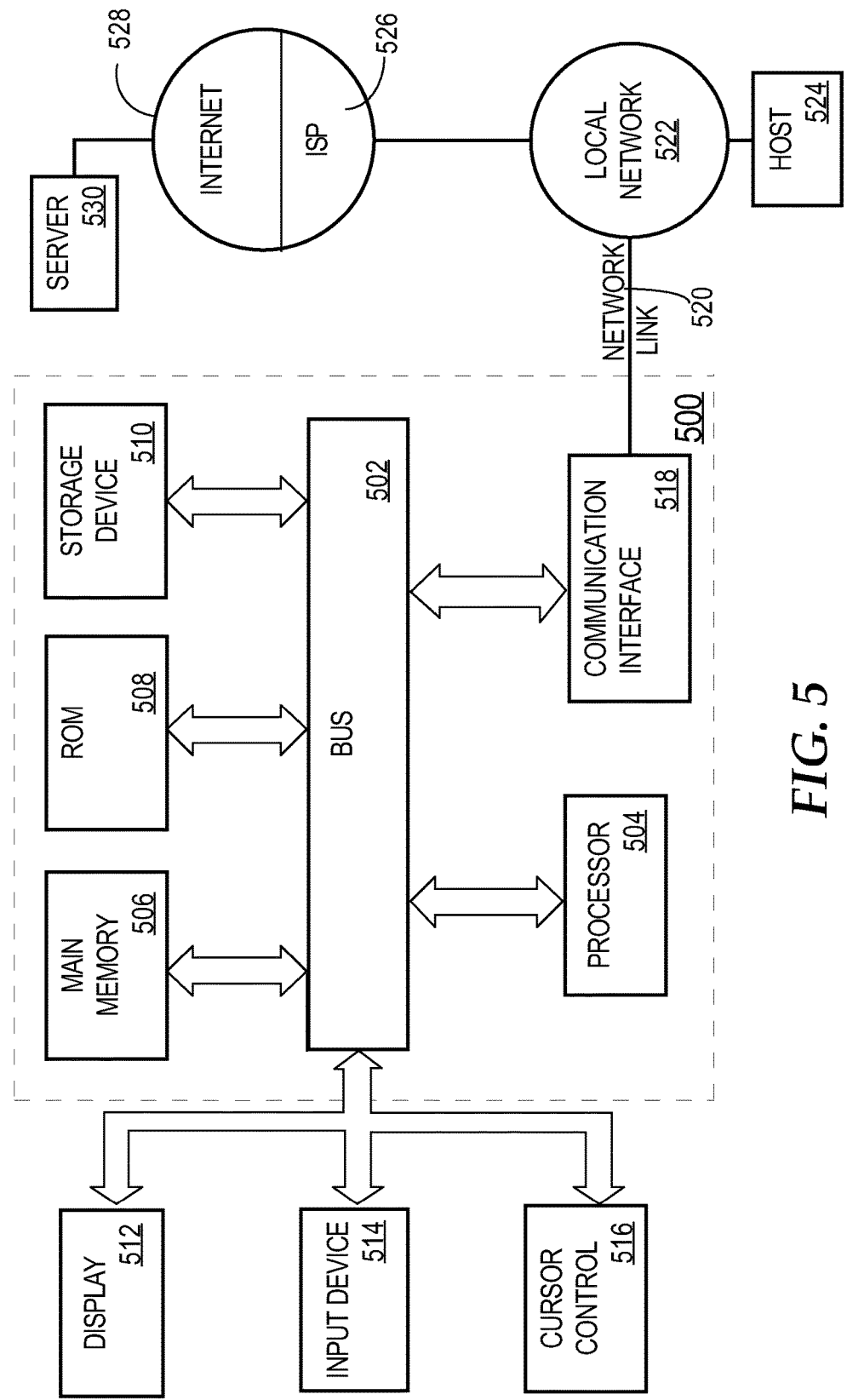
FIG. 5 illustrates a computer system upon which one or more embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   assigning a selected priority and a selected category to each of a plurality of virtual channels selected from a set of virtual channels associated with a physical communication channel within a switched fabric;
   wherein each selected priority is selected from a plurality of priorities comprising a first priority and a second priority;
   wherein each selected category is selected from a plurality of categories comprising a first category and a second category, wherein the first category is based on a first message size and the second category is based on a second message size that is larger than the first message size, wherein more virtual channels are assigned the first category than the second category;
   directing outbound messages to the plurality of virtual channels based on a category and a priority of each outbound message;
   segmenting each outbound message into one or more respective packets to generate a plurality of packets that each do not exceed a maximum packet size, wherein said second message size exceeds said maximum packet size;
   processing the plurality of virtual channels in a circular order to send a same amount of packets from said plurality of packets for each virtual channel over the physical communication channel within the switched fabric;
   wherein the method is performed by one or more computing devices.

2. The method of claim 1,
   wherein the outbound messages comprise database messages including redo records;
   wherein redo records are associated with the first priority.

3. The method of claim 2, wherein the redo records comprise at least one data block.

4. The method of claim 2, wherein the redo records comprise at least one control message.

5. The method of claim 2, wherein:
   the plurality of priorities contains a third priority;
   the outbound messages comprise additional messages that do not contain redo records;
   the additional messages comprise control messages that are associated with the second priority and data blocks that are associated with the third priority.

6. The method of claim 5, wherein:
   the additional messages comprise small messages that contain a respective single data block;
   the small messages are associated with the second priority.

7. The method of claim 1, wherein at least one physical communication channel comprises an InfiniBand link and the plurality of virtual channels are low-priority InfiniBand™ Virtual Lanes.

8. The method of claim 1, further comprising:
   receiving configuration data specifying priority data for at least one message type;
   determining the plurality of categories based at least in part on the priority data for the at least one message type.

9. A method comprising:
   assigning a first priority to a first virtual channel set comprising at least two virtual channels of a plurality of virtual channels associated with a physical communication channel within a switched fabric;
   assigning a second priority to a second virtual channel set comprising at least one virtual channel of the plurality of virtual channels;
   wherein the first virtual channel set has more virtual channels than the second virtual channel set;
   assigning one of a first category that is based on a first message size and a second category that is based on a second message size to each virtual channel of at least one virtual channel set of: the first virtual channel set or the second virtual channel set, wherein the first message size is smaller than the second message size, wherein more virtual channels are assigned the first category than the second category;
   wherein outbound messages corresponding to the first category are directed to virtual channels of the first category;
   wherein outbound messages corresponding to the second category are directed to virtual channels of the second category;
   directing outbound messages of the first priority to virtual channels of the first virtual channel set;
   directing outbound messages of the second priority to virtual channels of the second virtual channel set;
   segmenting each outbound message into one or more respective packets to generate a plurality of packets that each do not exceed a maximum packet size, wherein said second message size exceeds said maximum packet size;
   processing the plurality of virtual channels in a round-robin order, wherein processing comprises sending a same amount of packets from said plurality of packets for each virtual channel over the physical communication channel within the switched fabric;
   wherein the method is performed by one or more computing devices.

10. One or more non-transitory computer-readable media storing instructions which, when executed by one or more computing devices, cause:
    assigning a selected priority and a selected category to each of a plurality of virtual channels selected from a set of virtual channels associated with a physical communication channel within a switched fabric;
wherein each selected priority is selected from a plurality of priorities comprising a first priority and a second priority;
wherein each selected category is selected from a plurality of categories comprising a first category and a second category, wherein the first category is based on a first message size and the second category is based on a second message size that is larger than the first message size, wherein more virtual channels are assigned the first category than the second category;
directing outbound messages to the plurality of virtual channels based on a category and a priority of each outbound message;
segmenting each outbound message into one or more respective packets to generate a plurality of packets that each do not exceed a maximum packet size, wherein said second message size exceeds said maximum packet size;
processing the plurality of virtual channels in a circular order to send a same amount of packets from said plurality of packets for each virtual channel over the physical communication channel within the switched fabric.

11. The one or more non-transitory computer-readable media of claim 10,
wherein the outbound messages comprise database messages including redo records;
wherein redo records are associated with the first priority.

12. The one or more non-transitory computer-readable media of claim 11, wherein the redo records comprise at least one data block.

13. The one or more non-transitory computer-readable media of claim 11, wherein the redo records comprise at least one control message.

14. The one or more non-transitory computer-readable media of claim 11, wherein:
the plurality of priorities contains a third priority;
the outbound messages comprise additional messages that do not contain redo records;
the additional messages comprise control messages that are associated with the second priority and data blocks that are associated with the third priority.

15. The one or more non-transitory computer-readable media of claim 14, wherein:
the additional messages comprise small messages that contain a respective single data block;
the small messages are associated with the second priority.

16. The one or more non-transitory computer-readable media of claim 10, wherein at least one physical communication channel comprises an InfiniBand™ link and the plurality of virtual channels are low-priority InfiniBand™ Virtual Lanes.

17. The one or more non-transitory computer-readable media of claim 10, the instructions further comprising instructions for:
receiving configuration data specifying priority data for at least one message type;
determining the plurality of categories based at least in part on the priority data for the at least one message type.

* * * * *

UNITED STATES PATENT AND TRADEMARK OFFICE
CERTIFICATE OF CORRECTION

PATENT NO.         : 10,250,510 B2                                                Page 1 of 1
APPLICATION NO.    : 14/488161
DATED              : April 2, 2019
INVENTOR(S)        : Sridharan et al.

It is certified that error appears in the above-identified patent and that said Letters Patent is hereby corrected as shown below:

In the Specification

In Column 4, Line 4, delete "PRIORITY" and insert -- PRIORITY; --, therefor.

Signed and Sealed this
Third Day of November, 2020

Andrei Iancu
*Director of the United States Patent and Trademark Office*